(12) United States Patent
Kawai

(10) Patent No.: US 11,811,022 B2
(45) Date of Patent: *Nov. 7, 2023

(54) SECONDARY BATTERY

(71) Applicant: Murata Manufacturing Co., Ltd., Nagaokakyo (JP)

(72) Inventor: Toru Kawai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,594

(22) Filed: Dec. 2, 2021

(65) Prior Publication Data

US 2022/0093974 A1    Mar. 24, 2022

Related U.S. Application Data

(63) Continuation of application No. 16/524,643, filed on Jul. 29, 2019, now Pat. No. 11,223,067, which is a (Continued)

(30) Foreign Application Priority Data

Mar. 24, 2017    (JP) .................................. 2017-059833

(51) Int. Cl.
*H01M 10/0585* (2010.01)
*H01M 10/0525* (2010.01)
(Continued)

(52) U.S. Cl.
CPC ....... *H01M 10/0585* (2013.01); *H01M 4/131* (2013.01); *H01M 10/0525* (2013.01);
(Continued)

(58) Field of Classification Search
CPC ............. H01M 10/0585; H01M 50/46; H01M 50/116; H01M 50/531; H01M 50/543;
(Continued)

(56) References Cited

U.S. PATENT DOCUMENTS 8,940,429 B2   1/2015   Spare
9,893,376 B2   2/2018   Yang et al.
(Continued)

FOREIGN PATENT DOCUMENTS

CN   101847755 A   9/2010
JP   2003142161 A   5/2003
(Continued)

OTHER PUBLICATIONS

International Search Report issued in PCT/JP2018/008751, dated Jun. 12, 2018.
(Continued)

*Primary Examiner* — Stewart A Fraser
(74) *Attorney, Agent, or Firm* — ArentFox Schiff LLP

(57) ABSTRACT

A secondary battery that includes an electrode assembly having a plurality of electrode configuration layers, each electrode configuration layer including a positive electrode, a negative electrode, and a separator between the positive electrode and the negative electrode; and an exterior body enclosing the electrode assembly. The electrode assembly has a substantially circular plan view shape with a single partial notch.

11 Claims, 7 Drawing Sheets

Related U.S. Application Data continuation of application No. PCT/JP2018/008751, filed on Mar. 7, 2018.

(51) Int. Cl.
| | |
|---|---|
| *H01M 50/46* | (2021.01) |
| *H01M 50/531* | (2021.01) |
| *H01M 50/543* | (2021.01) |
| *H01M 4/131* | (2010.01) |
| *H01M 4/02* | (2006.01) |
| *H01M 50/119* | (2021.01) |

(52) U.S. Cl.
CPC ......... *H01M 50/46* (2021.01); *H01M 50/543* (2021.01); *H01M 50/119* (2021.01); *H01M 2004/027* (2013.01); *H01M 2004/028* (2013.01)

(58) Field of Classification Search
CPC ....... H01M 10/0525; H01M 2004/027; H01M 2004/028
See application file for complete search history.

(56) References Cited

U.S. PATENT DOCUMENTS

| | | | |
|---|---|---|---|
| 10,366,844 B2 | 7/2019 | Tamachi et al. | |
| 2012/0015236 A1 | 1/2012 | Spare | |
| 2016/0049687 A1 | 2/2016 | Yang et al. | |
| 2016/0315296 A1* | 10/2016 | Kimura | ............... H01M 50/124 |
| 2017/0110713 A1 | 4/2017 | Otsuka | |
| 2017/0207491 A1* | 7/2017 | Tamachi | ................ H01G 11/82 |
| 2020/0243822 A1* | 7/2020 | Sodeyama | .......... H01M 50/213 |

FOREIGN PATENT DOCUMENTS

| | | |
|---|---|---|
| JP | 2011081941 A | 4/2011 |
| JP | 2013535774 A | 9/2013 |
| JP | 2014049371 A | 3/2014 |
| JP | 2015536036 A | 12/2015 |
| JP | 2017130435 A | 7/2017 |
| WO | 2016006420 A1 | 1/2016 |

OTHER PUBLICATIONS

Written Opinion of the International Searching Authority issued in PCT/JP2018/008751, dated Jun. 12, 2018.

* cited by examiner

PRESENT INVENTION
(SINGLE PARTIAL NOTCH)

$Va < Vb$

CONTRAST ART
(NON-SINGLE NOTCH)

SECONDARY BATTERY

CROSS REFERENCE TO RELATED APPLICATIONS

The present application is a continuation of application Ser. No. 16/524,643, filed Jul. 29, 2019, which is a continuation of International application No. PCT/JP2018/008751, filed Mar. 7, 2018, which claims priority to Japanese Patent Application No. 2017-059833, filed Mar. 24, 2017, the entire contents of each of which are incorporated herein by reference.

FIELD OF THE INVENTION

The present invention relates to a secondary battery. In particular, the present invention relates to a secondary battery which includes an electrode assembly including electrode configuration layers having a positive electrode, a negative electrode, and a separator.

BACKGROUND OF THE INVENTION

A secondary battery can be repeatedly charged and discharged because the secondary battery is a so-called "storage battery", and is used for various applications. For example, the secondary battery is used for mobile devices such as mobile phones, smart phones and laptop computers.

In various battery applications including mobile devices and the like, the secondary battery is used in a state where the secondary battery is accommodated in a housing. That is, the secondary battery is disposed in a housing of a device to be used. The inside of the housing is a limited space. The shape of the secondary battery may be determined depending on the limited space of various types of the mobile devices.

Patent Document 1: National Publication of International Patent Application No. 2015-536036
Patent Document 2: Japanese Patent Application Laid-Open No. 2014-49371
Patent Document 3: Japanese Patent Application Laid-Open No. 2003-142161

SUMMARY OF THE INVENTION

The present inventors have noticed that there is a problem to be overcome in conventional secondary batteries and have found a necessity to solve the problem. Specifically, the present inventors have found that there is the following problem.

Various shapes can be considered as the shape of the secondary battery, but it is necessary not only to merely form the battery into a desired shape but also to consider matters specific to the shape. In particular, the present inventors found that a so-called coin-type secondary battery need secure a space for routing a so-called "tab", which may cause battery characteristics (for example, energy density per unit volume) to be damaged more than necessary. This is particularly noticeable when the upper and lower surfaces of the coin-type secondary battery are made to function as external terminals.

The present invention has been made in view of the above problem. That is, a main object of the present invention is to provide a coin-type secondary battery more suitable in terms of battery characteristics.

The present inventors have attempted to solve the above problem from a new direction rather than following the conventional technology. As a result, the invention of the secondary battery has been completed in which the above-described main object is achieved.

A secondary battery according to the present invention includes: an electrode assembly having a plurality of electrode configuration layers, each electrode configuration layer including a positive electrode, a negative electrode, and a separator between the positive electrode and the negative electrode, wherein the electrode assembly has a substantially circular plan view shape with a single partial notch; and an exterior body enclosing the electrode assembly.

The present invention provides a more suitable coin-type secondary battery. Specifically, in the secondary battery of the present invention, the partial notch in the plan view shape having a circular notch in the electrode assembly is a "single" notch, which provides a more suitable coin-type battery.

That is, the present invention achieves a coin-type secondary battery more suitable from the viewpoint of energy density (energy density per unit volume) caused by a substantially circular shape (plan view shape) electrode assembly having single notch.

DETAILED DESCRIPTION OF THE INVENTION

Figure 1:
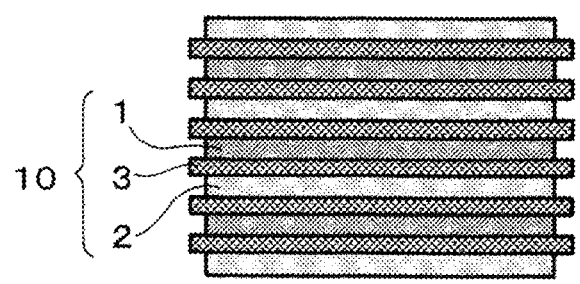
FIG. 1 is a schematic cross-sectional view showing an electrode configuration layer.

Hereinafter, a secondary battery according to an embodiment of the present invention will be described in more detail. Although the description will be made with reference to the drawings as necessary, various elements in the drawings are merely schematically and exemplarily shown for understanding of the present invention, and the appearance and the dimensional ratio and the like can be different from those of an actual secondary battery.

The "thickness" direction described directly or indirectly in the present description is based on the stacking direction of electrode materials configuring the secondary battery. For example, in the case of a "secondary battery having a plate-like thickness" such as a flat battery, the direction of the "thickness" corresponds to the plate thickness direction of the secondary battery. The term "plan view" used in the present description is based on a sketch drawing when an object is viewed from the upper or lower side along the thickness direction. In the present description, the term "cross-sectional view" is based on an imaginary cross section of an object obtained by cutting along the thickness direction of the secondary battery.

The terms "vertical direction" and "horizontal direction" used directly or indirectly in the present description respectively correspond to the vertical direction and the horizontal direction in the drawings. Unless otherwise specified, the same reference signs or symbols denote the same members or parts, or the same semantic contents. In a suitable aspect, it can be understood that a vertical downward direction (that is, a direction in which gravity acts) corresponds to the term "downward direction" and the opposite direction corresponds to the term "upward direction".

[Configuration of Secondary Battery of the Present Invention]

In the present invention, a secondary battery is provided. The term "secondary battery" as used in the present description refers to a battery which can be repeatedly charged and discharged. Therefore, the secondary battery of the present invention is not excessively limited by its name, and for example, the term "electric storage device" and the like can be included in the subject of the present invention.

The secondary battery according to the present invention includes an electrode assembly formed by stacking electrode configuration layers including a positive electrode, a negative electrode, and a separator. FIG. 1 illustrates an electrode assembly. As illustrated, a positive electrode 1 and a negative electrode 2 are stacked with a separator 3 interposed therebetween to form an electrode configuration layer 10, and at least one or more of the electrode configuration layers 10 are stacked to configure the electrode assembly. In the secondary battery, such an electrode assembly is enclosed in an exterior body together with an electrolyte (for example, a nonaqueous electrolyte). The structure of the electrode assembly is not necessarily limited to a planar stacked structure, and for example, the electrode assembly may have a wound structure (jelly-roll type) obtained by winding an electrode unit (electrode configuration layer) including a positive electrode, a negative electrode and a separator disposed between the positive electrode and the negative electrode in a roll form. For example, the electrode assembly may have a so-called stack and folding type structure in which a positive electrode, a separator, and a negative electrode are stacked on a long film, and then folded.

The positive electrode is composed of at least a positive electrode material layer and a positive electrode current collector. In the positive electrode, a positive electrode material layer is provided on at least one side of the positive electrode current collector, and the positive electrode material layer contains a positive electrode active material as an electrode active material. For example, in the plurality of positive electrodes in the electrode assembly, the positive electrode material layer may be provided on each of both surfaces of the positive electrode current collector, or may be provided only on one surface of the positive electrode current collector.

The negative electrode is composed of at least a negative electrode material layer and a negative electrode current collector. In the negative electrode, a negative electrode material layer is provided on at least one surface of the negative electrode current collector, and the negative electrode material layer contains a negative electrode active material as an electrode active material. For example, in the plurality of negative electrodes in the electrode assembly, the negative electrode material layer may be provided on each of both surfaces of the negative electrode current collector, or may be provided only on one surface of the negative electrode current collector.

The electrode active material contained in the positive electrode and the negative electrode, that is, the positive electrode active material and the negative electrode active material are substances directly involved in the transfer of electrons in the secondary battery, and are main substances of the positive and negative electrodes which are responsible for charging and discharging, that is, a battery reaction. More specifically, ions are generated in the electrolyte by the "positive electrode active material contained in the positive electrode material layer" and the "negative electrode active material contained in the negative electrode material layer", and the ions move between the positive electrode and the negative electrode and the electrons are transferred, whereby charging and discharging are performed. The positive electrode material layer and the negative electrode material layer are particularly preferably layers capable of occluding and releasing lithium ions. That is, the secondary battery according to the present invention is preferably a nonaqueous electrolyte secondary battery in which lithium ions move between a positive electrode and a negative electrode via a nonaqueous electrolyte, to charge and discharge the battery. When lithium ions are involved in charging and discharging, the secondary battery according to the present invention corresponds to a so-called "lithium ion battery", and the positive electrode and the negative electrode include a layer capable of occluding and releasing lithium ions.

The positive electrode active material of the positive electrode material layer contains, for example, a granular material, and it is preferable that a binder be contained in the positive electrode material layer in order to maintain a sufficient contact between grains and the shape of the grains. Furthermore, a conductive auxiliary agent may be contained in the positive electrode material layer in order to facilitate transmission of electrons promoting the battery reaction. Similarly, when the negative electrode active material of the negative electrode material layer contains, for example, a granular material, a binder is preferably contained in order to maintain a sufficient contact between grains and the shape of the grains, and a conductive auxiliary agent may be contained in the negative electrode material layer in order to facilitate transmission of electrons promoting the battery reaction. As described above, since a plurality of components are contained, the positive electrode material layer and the negative electrode material layer can also be referred to as "positive electrode mixture layer" and "negative electrode mixture layer", respectively.

It is preferable that the positive electrode active material be a material contributing to occlusion and release of lithium ions. From these viewpoints, it is preferable that the positive electrode active material be, for example, a lithium-containing composite oxide. More specifically, it is preferable that the positive electrode active material is a lithium transition metal composite oxide which contains lithium and at least one transition metal selected from the group consisting of cobalt, nickel, manganese, and iron. That is, in the positive electrode material layer of the secondary battery according to the present invention, the lithium transition metal composite oxide is preferably contained as the positive electrode active material. For example, the positive electrode active material may be lithium cobaltate, lithium nickelate, lithium manganate, lithium iron phosphate, or materials in which a part of the transition metal of these is substituted with another metal. The positive electrode active material may be contained singly or two or more kinds thereof may be contained in combination. Although it is merely an example, in the secondary battery according to the present invention, the positive electrode active material contained in the positive electrode material layer may be lithium cobaltate.

The binder which can be contained in the positive electrode material layer is not particularly limited, but examples thereof include at least one selected from the group consisting of polyvinylidene fluoride, a vinylidene fluoride-hexafluoropropylene copolymer, a vinylidene fluoride-tetrafluoroethylene copolymer, and polytetrafluoroethylene and the like. The conductive auxiliary agent which can be contained in the positive electrode material layer is not particularly limited, but examples thereof include at least one selected from carbon blacks such as thermal black, furnace black, channel black, ketjen black, and acetylene black; carbon fibers such as graphite, carbon nanotube, and vapor-grown carbon fiber; metal powders such as copper, nickel, aluminum, and silver; and polyphenylene derivatives. For example, the binder of the positive electrode material layer may be polyvinylidene fluoride, and the conductive auxiliary agent of the positive electrode material layer may be carbon black. Although it is merely an example, the binder and the conductive auxiliary agent in the positive electrode material layer may be a combination of polyvinylidene fluoride and carbon black.

It is preferable that the negative electrode active material be a material contributing to occlusion and release of lithium ions. From this viewpoint, as the negative electrode active material, for example, various carbon materials, oxides, or lithium alloys are preferred.

Examples of the various carbon materials for the negative electrode active material include graphite (natural graphite and artificial graphite), hard carbon, soft carbon, and diamond-like carbon. Particularly, graphite is preferred because it has high electron conductivity and excellent adhesiveness to the negative electrode current collector, and the like. Examples of the oxide of the negative electrode active material include at least one selected from the group consisting of silicon oxide, tin oxide, indium oxide, zinc oxide, and lithium oxide and the like. The lithium alloy of the negative electrode active material may be any metal as long as the metal can be alloyed with lithium, and the lithium alloy may be, for example, a binary, ternary or higher alloy of a metal such as Al, Si, Pb, Sn, In, Bi, Ag, Ba, Ca, Hg, Pd, Pt, Te, Zn or La and lithium. It is preferable that the structural form of the oxide be amorphous. This is because degradation due to nonuniformity such as grain boundaries or defects is unlikely to be caused. Although it is merely an example, in the secondary battery according to the present invention, the negative electrode active material of the negative electrode material layer may be artificial graphite.

The binder which can be contained in the negative electrode material layer is not particularly limited, but examples thereof include at least one kind selected from the group consisting of styrene-butadiene rubber, polyacrylic acid, polyvinylidene fluoride, polyimide-based resin, and polyamideimide-based resin. For example, the binder contained in the negative electrode material layer may be a styrene butadiene rubber. The conductive auxiliary agent which can be contained in the negative electrode material layer is not particularly limited, but examples thereof include at least one selected from carbon blacks such as thermal black, furnace black, channel black, ketjen black, and acetylene black; carbon fibers such as graphite, carbon nanotube, and vapor-grown carbon fiber; metal powders such as copper, nickel, aluminum, and silver; and polyphenylene derivatives. The negative electrode material layer may contain a component caused by a thickener component (for example, carboxymethyl cellulose) used at the time of producing the battery.

Although it is merely an example, the negative electrode active material and the binder in the negative electrode material layer may be a combination of artificial graphite and styrene-butadiene rubber.

The positive electrode current collector and the negative electrode current collector used for the positive electrode and the negative electrode are members which contribute to the collection and supply of electrons generated in the active material by the battery reaction. Each of the current collectors may be a sheet-like metal member and may have a porous or perforated form. For example, each of the current collectors may be a metal foil, a punching metal, a net, an expanded metal, and the like. The positive electrode current collector used for the positive electrode preferably contains a metal foil containing at least one selected from the group consisting of aluminum, stainless steel, and nickel and the like, and may be, for example, an aluminum foil. Meanwhile, the negative electrode current collector used for the negative electrode preferably contains a metal foil containing at least one selected from the group consisting of copper, stainless steel, and nickel and the like, and may be, for example, a copper foil.

The separator used for the positive electrode and the negative electrode is a member provided from the viewpoints of the prevention of short circuit due to contact between the positive and negative electrodes and the holding of the electrolyte and the like. In other words, it can be said that the separator is a member which allows ions to pass while preventing electronic contact between the positive and negative electrodes. Preferably, the separator is a porous or microporous insulating member and has a film form due to its small thickness. Although it is merely an example, a microporous membrane made of polyolefin may be used as the separator. In this respect, the microporous membrane used as the separator may contain, for example, only polyethylene (PE) or only polypropylene (PP) as polyolefin. Furthermore, the separator may be a stacked body composed of "a microporous membrane made of PE" and "a microporous membrane made of PP". The surface of the separator may be covered with an inorganic grain coating layer, an adhesive layer, and the like. The surface of the separator may have adhesiveness. In the present invention, the separator should not be limited, particularly by its name, and may be a solid electrolyte, a gel electrolyte, an insulating inorganic grain and the like, which have a similar function.

In the secondary battery of the present invention, an electrode assembly including an electrode configuration layer including a positive electrode, a negative electrode, and a separator is enclosed in an exterior body together with an electrolyte. When the positive electrode and the negative electrode include a layer capable of occluding and releasing lithium ions, the electrolyte is preferably "a nonaqueous-based" electrolyte such as an organic electrolyte or an organic solvent (that is, the electrolyte is preferably a nonaqueous electrolyte). In the electrolyte, metal ions released from electrodes (positive and negative electrodes) are present, and thus the electrolyte helps the transfer of metal ions in the battery reaction.

The nonaqueous electrolyte is an electrolyte containing a solvent and a solute. As a specific solvent for the nonaqueous electrolyte, a solvent containing at least a carbonate is preferred. The carbonates may be cyclic carbonates and/or chain carbonates. Although not particularly limited, examples of the cyclic carbonates include at least one kind selected from the group consisting of propylene carbonate (PC), ethylene carbonate (EC), butylene carbonate (BC), and vinylene carbonate (VC). Examples of the chain carbonates include at least one kind selected from the group consisting of dimethyl carbonate (DMC), diethyl carbonate (DEC), ethyl methyl carbonate (EMC), and dipropyl carbonate (DPC). Although it is merely an example, a combination of cyclic carbonates and chain carbonates may be used as the nonaqueous electrolyte, and, for example, a mixture of ethylene carbonate and diethyl carbonate may be used. As a solute of a specific nonaqueous electrolyte, for example, an Li salt such as $LiPF_6$ and/or $LiBF_4$ is preferably used.

The exterior body of the secondary battery is intended to wrap the electrode assembly formed by stacking electrode configuration layers including a positive electrode, a negative electrode, and a separator, but may be in a form of a hard case, or in a form of a soft case. Specifically, the exterior body may have a hard case type corresponding to a so-called "metal can", or may have a soft case type corresponding to a "pouch" composed of a so-called laminate film.

[Characteristics of Secondary Battery of the Present Invention]

Figure 2:
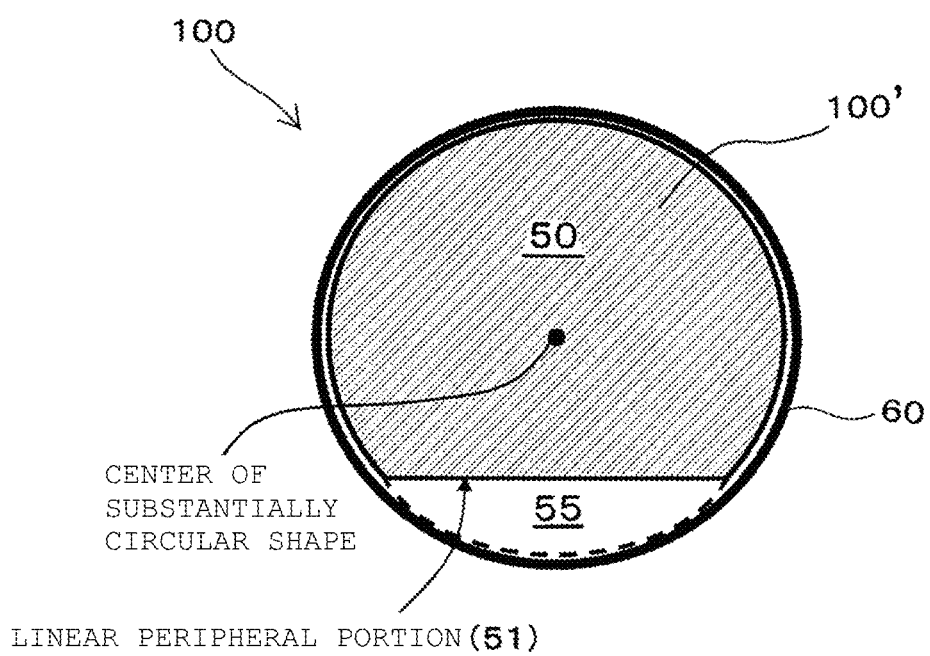
FIG. 2 is a schematic view showing a "plan view shape having circular notch".

The secondary battery of the present invention has characteristics in the shape of the electrode assembly. In particular, the present invention has characteristics in a form related to the plan view shape of the electrode assembly. Specifically, as shown in FIG. 2, an electrode assembly 100' of a secondary battery 100 has a plan view shape 50 having a circular notch. The "plan view shape having a circular notch" corresponds to a substantially circular shape having a single partial notch 55.

The electrode assembly 100' is preferably formed by stacking electrode configuration layers 10 including a positive electrode 1, a negative electrode 2, and a separator 3 therebetween (see FIG. 1). The electrode assembly 100' has a substantially circular plan view shape, and a part of the plan view shape is locally cut away. That is, although the electrode assembly 100' has a substantially circular plan view shape as a whole, the electrode assembly 100' has a plan view shape 50 in which the substantially circular shape is partially cut away.

The term "plan view shape" in the context of the electrode assembly in the present invention is particularly based on the shape of a sketch drawing when the electrode assembly is viewed from the upper or lower side along the stacking direction of the electrode configuration layers (the positive electrode, the negative electrode, and the separator). Therefore, in the present invention, the shape of the electrode assembly when the electrode assembly is viewed from the upper or lower side along the stacking direction of the positive and negative electrodes is a "substantially circular shape having a partial notch".

Herein, the term "substantially circular shape (substantially circular)" is not limited to being a complete circular shape (that is, merely a "circle" or a "true circle"), and examples thereof include shapes which may usually be included in a "rounded shape" as understood by those skilled in the art while being changed from the complete circular shape. For example, the substantially circular shape may be not only the circle or the true circle but also a shape having a locally different circular arc curvature, or a shape derived from the circle or the true circle such as an ellipse.

Figure 3:
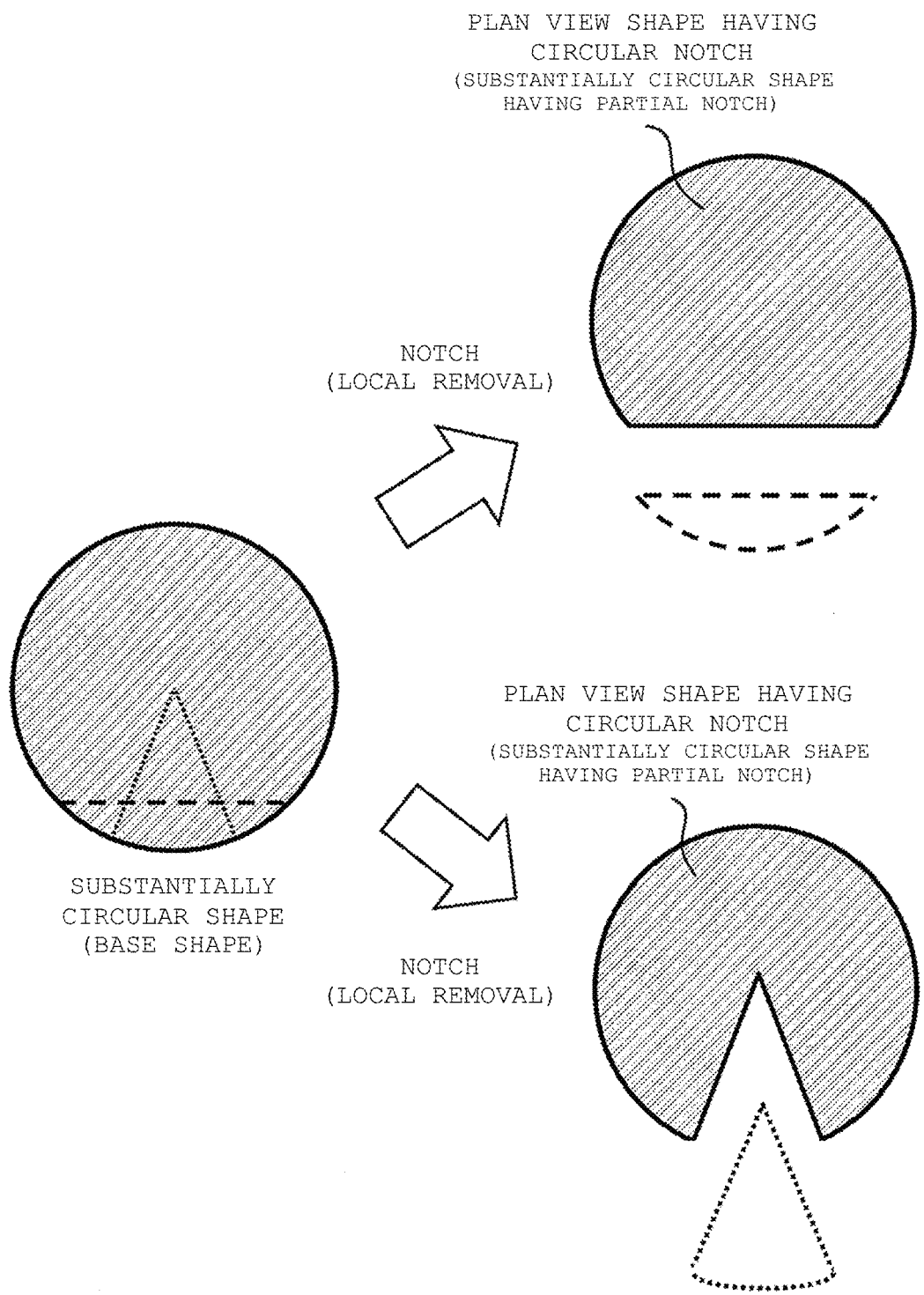
FIG. 3 is a diagram for illustrating a "plan view shape having circular notch" in one embodiment of the present invention.

In the secondary battery according to the present invention, the electrode assembly has the "plan view shape having a circular notch". That is, the plan view shape of the electrode assembly is a "substantially circular shape having a partial notch". In the present invention, the "plan view shape having a circular notch" means, in a broad sense, a plan view shape in which a part is locally removed from a substantially circular shape (a base shape), and preferably a plan view shape in which a part thereof is removed from a substantially circular base shape from the outside, including a part of the periphery of the substantially circular shape. In a narrow sense, the "plan view shape having a circular notch" means a plan view shape obtained by removing an area region of less than half of a "substantially circular shape of an original base shape", and preferably less than one-quarter (for example, less than one-sixth, less than one-seventh, or less than one-eighth) from the substantially circular shape (see FIG. 3).

The secondary battery according to the present invention has a single "partial notch" in the circular notch shape of the electrode assembly. That is, only one region is removed from the "original substantially circular shape". The secondary battery has a plan view shape in which two or more regions removed from the "original substantially circular shape" are not present. In other words, the plan view shape having circular notch of the electrode assembly is a substantially circular shape having only a single partial notch (the plan view shape having circular notch of the electrode assembly can also be referred to as having "single partial notch"/"only one partial notch").

The plan view shape of the electrode assembly can contribute to more suitable realization of a coin-type battery. Specifically, the secondary battery of the present invention can be a coin-type battery having energy density further improved due to the "single partial notch". For example, as can be understood from FIG. 4, a dead space in the exterior body is wholly reduced as compared with "two or more partial notches" because of the "single partial notch", which provides the secondary battery having further improved energy density per unit volume.

The secondary battery of the present invention has more excellent stability retainability of the electrode assembly in the exterior body due to the "single partial notch". In particular, as can be understood from FIG. 4, in the case of the "single partial notch", a ratio in which the periphery of the electrode assembly and the side wall of the exterior body complementarily face each other effectively increases, whereby the electrode assembly is more suitably held in the exterior body. That is, as compared with the "two or more partial notches", the electrode assembly is more effectively prevented from being undesirably or incidentally shifted or rattled in the exterior body, which can realize a secondary battery having more excellent safety and use environment compatibility and the like.

Figure 5:
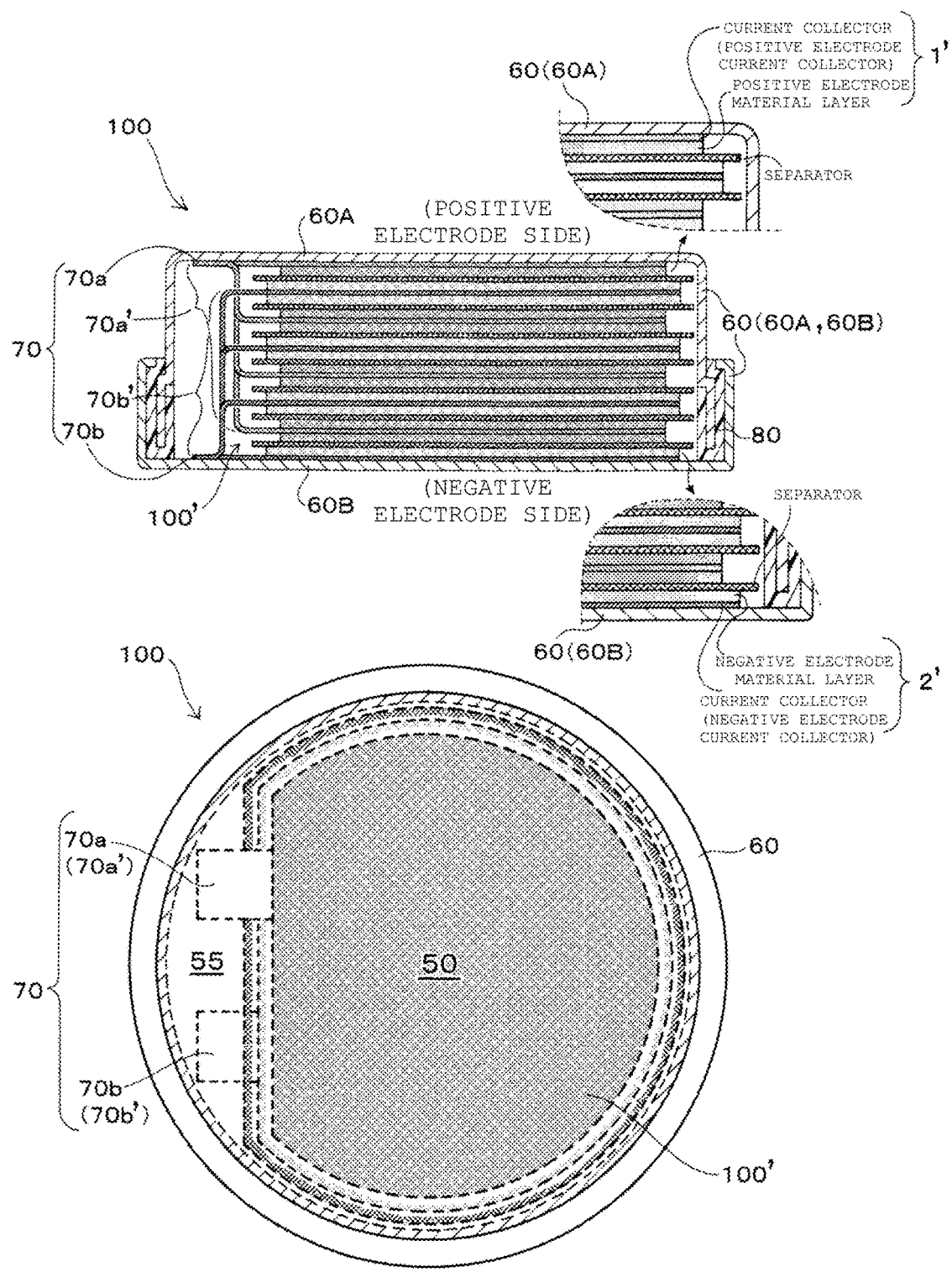
FIG. 5 is a schematic view showing a secondary battery according to one embodiment of the present invention (upper side: cross-sectional view, lower side: transparent plan view).
Figure 6:
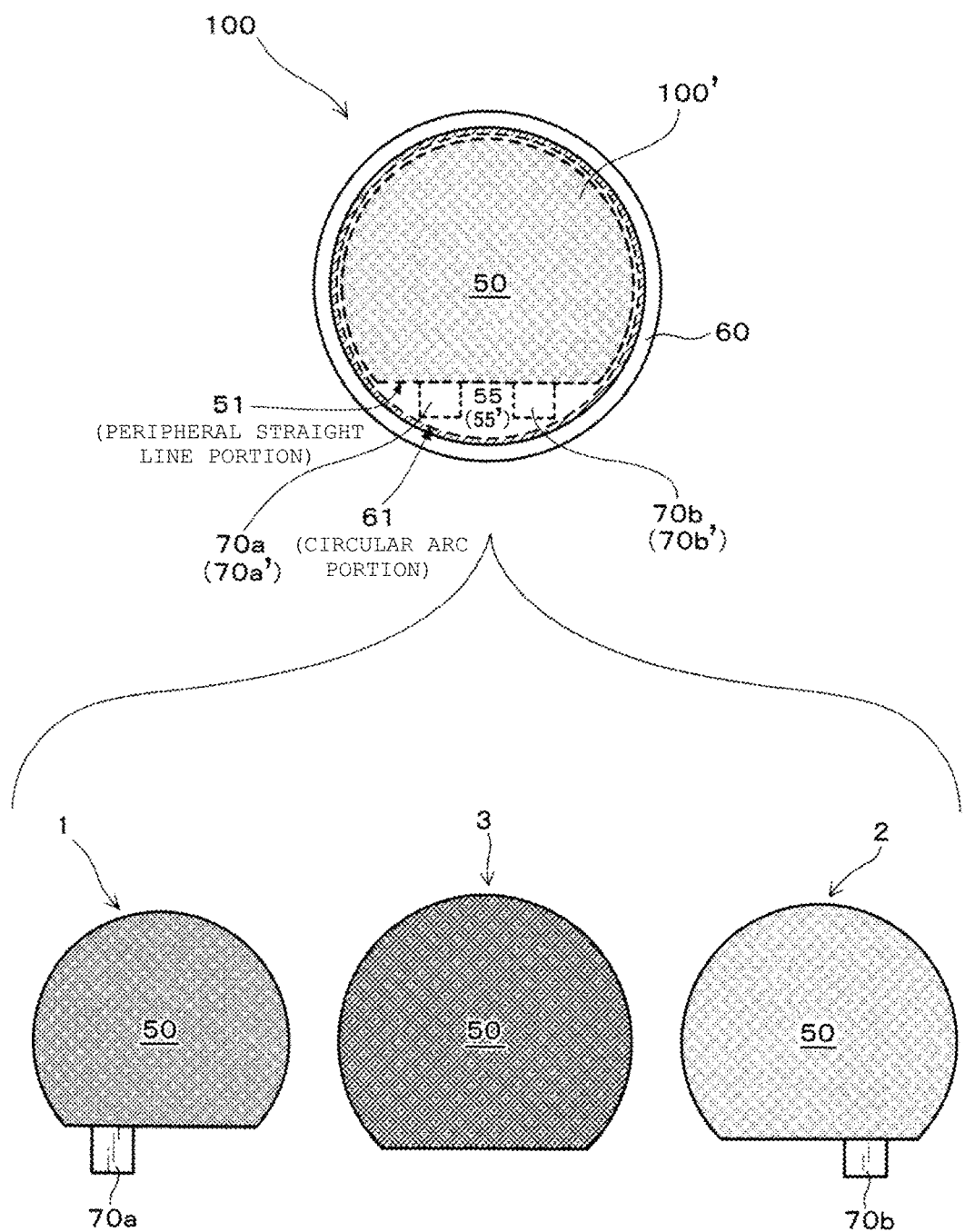
FIG. 6 is a transparent plan view and a partially developed view schematically showing a secondary battery according to an embodiment of the present invention.

In the "plan view shape having a circular notch" of the electrode assembly, it is preferable that a positive electrode tab and a negative electrode tab be located adjacent to each other in the region of the partial notch. In other words, it is preferable that the positive electrode tab and the negative electrode tab be adjacent to each other in a space (a local space in the exterior body) corresponding to the region of the partial notch of the electrode assembly disposed in the exterior body, and protrude from the exterior body. In particular, it is preferable that the positive electrode tab and the negative electrode tab be located adjacent to each other in the region of the "single partial notch" in plan view. That is, as shown in FIGS. 5 and 6, a positive electrode tab 70a and a negative electrode tab 70*b* are preferably provided close to each other so as to be arranged side by side in a space 55 (more specifically, the "local space in the exterior body") provided due to the "single partial notch".

In the present description, the "tab" means, in a broad sense, an external terminal element for providing electrical connection with the outside. In a narrow sense, the "tab" means an external terminal element which is a part of a current collector of a positive electrode or a negative electrode, and has a form in which an electrode active material (a positive electrode material, a negative electrode material) is not particularly provided, and the external terminal element protrudes from the positive electrode or the negative electrode in the electrode assembly.

The "positive electrode tab and the negative electrode tab are located adjacent to each other" in the present invention means that the positive electrode tab and the negative electrode tab are arranged side by side close to each other in plan view. Although it is merely an example, when the width dimension of the tab (for example, the average dimension of the tab width) is taken as "w" (see FIG. 4), a separation distance between the positive electrode tab and the negative electrode tab adjacent to each other in plan view may be 0.3 w or more and 30 w or less, and preferably 0.5 w or more and 20 w or less (for example, about 0.5 w or more and 10 w or less, or about 0.5 w or more and 5 w or less).

The secondary battery of the present invention may be a "coin-type" battery. For example, the secondary battery of the present invention is a battery having a disk-shaped appearance as a whole. In such a case, the plan view shape of the secondary battery is a substantially circular shape. This corresponds to the plan view shape of the exterior body in the secondary battery being a substantially circular shape. That is, the shape of the secondary battery or the exterior body as viewed from the upper or lower side in a sketch drawing along the stacking direction of the electrode configuration layers (the positive electrode, the negative electrode, and the separator) is the "substantially circular shape". The "substantially circular shape" referred to herein is not also limited to being a complete circle (that is, merely a "circle" or a "true circle") as described above, and examples thereof include shapes which may usually be included in a "rounded shape" as understood by those skilled in the art while being changed from the complete circle. For example, the substantially circular shape may be not only the circle or the true circle but also a shape having a locally different circular arc curvature, and a shape derived from a circle or a true circle such as an ellipse.

From the viewpoint of the "coin-type" battery, the secondary battery preferably has a three-dimensional flat shape. That is, the secondary battery preferably has an external shape which can be referred to as a "plate-like shape" or a "thin plate-like shape". In the present description, the "flat" means that at least a thickness dimension in the electrode assembly or the secondary battery is smaller than other dimension (in particular, a dimension which forms a plan view shape), and simply means that the overall appearance shape of the electrode assembly or the battery is the "plate-like shape" or the "thin plate-like shape". For example, when the maximum width dimension of the secondary battery in plan view is taken as "W" (see FIG. 4), the thickness of the flat secondary battery may be W/100 or more and W/5 or less, for example, W/50 or more and W/5 or less or W/20 or more and W/5 or less. The "flat" is preferable for at least a constrained battery installation space in a housing such as a mobile device.

When the plan view shape of the secondary battery is the substantially circular shape, the tab is preferably provided in a minute space between the body portion of the electrode assembly and the exterior body (the substantially circular shape in plan view), in particular, in a space provided due to the "single partial notch". Specifically, the positive electrode tab and the negative electrode tab are preferably located adjacent to each other in a gap provided between the body portion of the electrode assembly and the side wall of the exterior body (the substantially circular shape in plan view) due to the "single partial notch". In such a case, it is preferable that the positive electrode tab and the negative electrode tab face each other in plan view in a region of an imaginary "single partial notch" between the electrode assembly and the exterior body.

As can be seen from FIG. 6, the electrode assembly 100' having the plan view shape 50 having circular notch means that the positive electrode 1, the negative electrode 2, and the separator 3 configuring the assembly similarly have the "plan view shape having a circular notch". That is, the plan view shapes of the positive electrode 1, the negative electrode 2, and the separator 3 have the substantially circular shape having "single partial notch". Herein, the plan view size of the negative electrode 2 is preferably slightly larger than the plan view size of the positive electrode 1. Otherwise, this is because lithium is apt to be deposited from the negative electrode during use of the secondary battery (lithium deposition causes larger capacitance reduction with repeated charging and discharging during use of the battery, or overcharging causes heat generation or ignition).

In plan view from another cut edge, in the secondary battery of the present invention, a significant gap between the electrode assembly and the circular exterior body (for example, a gap which allows an exposed tab to protrude outward) is present only in the region of the "partial notch", and no or almost no gap is present in other region. In still another viewpoint, in a region other than the "partial notch" in plan view, the contour of the electrode assembly and the contour of the circular exterior body are complementary or similar, in contrast, the contours are not complementary or similar in the region of the "partial notch". In the region other than the "partial notch" in plan view, a distance between the contour of the electrode assembly and the contour of the circular exterior body is constant (substantially constant, and including also the case where the distance is "0"), in contrast, the distance can be said to be non-constant (substantially non-constant, and not including the case where the distance is "0") or variable in the region of the "partial notch".

In a suitable aspect, the exterior body itself of the secondary battery forms an external terminal. In such a case, the exterior body may be composed of at least two parts, one of the two parts forming a positive electrode terminal, the other of the two parts forming a negative electrode terminal.

For example, as shown in FIG. 5, an exterior body 60 may be composed of a pair of vessel-like members (60A, 60B) combined so as to face each other. One vessel-like member 60A may form a positive electrode terminal, in contrast, the other vessel-like member 60B may form a negative electrode terminal. More specifically, in the exterior body, it is preferable that the outer main surface of the "one vessel-like member" is the positive electrode terminal, and the outer main surface of the "other vessel-like member" is similarly the negative electrode terminal. Although it is merely an example, the "upper" vessel-like member 60A may form the positive electrode terminal, and the "lower" vessel-like member 60B may form the negative electrode terminal. In this aspect, an insulating material is preferably interposed in a joint portion between the "'one vessel-like member' forming the positive electrode terminal" and the "'other vessel-like member' forming the negative electrode terminal". For example, a gasket 80 interposed between the "'one vessel-like member' (60A) forming the positive electrode terminal" and the "'other vessel-like member' (60B) forming the negative electrode terminal" may have insulating properties (see FIG. 5).

When the exterior body of the secondary battery forms the external terminal, as shown in FIG. 5, a tab 70 (70a, 70b) extending from the body portion of the electrode assembly 100' may be in direct contact with the exterior body 60 (60A, 60B). As shown, it is preferable that the tab 70 extend from the body portion of the electrode assembly 100' to the exterior body 60 so as to be in contact with the inner surface of the exterior body 60.

Herein, the tab extending from the body portion of the electrode assembly may be composed of a stack of a plurality of current collectors. Specifically, the tab may be composed of a stack of protruding portions of a plurality of current collectors (for example, current collecting foils) provided on each of the positive electrode and the negative electrode. As can be seen from the illustrated aspect, the "positive electrode tab (70a) extending from the body portion of the electrode assembly" may have a structure in which the protruding portions of the current collectors of the plurality of positive electrodes configuring the electrode assembly 100' are integrated on the tip side. Similarly, the "negative electrode tab (70b) extending from the body portion of the electrode assembly" may have a structure in which the protruding portions of the current collectors of the plurality of negative electrodes configuring the electrode assembly 100' are integrated on the tip side.

Preferably, as shown in FIG. 5, the protruding portions of the plurality of current collectors of the stacked electrodes (the positive electrode or the negative electrode) of the electrode assembly 100' (the plurality of protruding portions adjacent to each other along the stacking direction) are integrated so as to be aggregated with each other, and the integrated tab is in contact with the inner surface of the exterior body. For example, when the "upper" vessel-like member 60A of the exterior body forms the positive electrode terminal, and the "lower" vessel-like member 60B forms the negative electrode terminal, the integrated tab 70a' of the "positive electrode" may be in contact with the inner surface of the "upper" vessel-like member 60A, in contrast, the integrated tab 70b' of the "negative electrode" may be in contact with the inner surface of the "lower" vessel-like member 60B. As shown in FIG. 5 (upper view), a contact point between the integral tab and the inner surface of the vessel-like member is preferably located in the region of the "single partial notch" in plan view.

Even in the case of such an integrated tab, the tabs are located adjacent to each other between the positive electrode and the negative electrode. That is, in the space 55 provided due to the "single partial notch", the integrated tab 70a' of the positive electrode and the integrated tab 70b' of the negative electrode are preferably provided side by side so as to form a pair in plan view (see the lower view of FIG. 5).

In a another aspect, in the periphery of the "plan view shape having a circular notch", a peripheral portion in the notch portion is linear. That is, a contour forming the circular notch shape of the electrode assembly is a "straight line" at a certain place. In the aspect shown in FIGS. 2, 5 and 6, only one place in the periphery of the circular notch shape is a "linear peripheral portion".

In the case of the "plan view shape having a circular notch" having only one linear peripheral portion (for example, in the case of an embodiment as shown in FIGS. 2, 5, and 6), a ratio of an area of the "single partial notch" (that is, a cut-away area regarded as one partially cut away from the substantially circular base shape) relative to an area of a substantially circular shape (base shape) is preferably 5% to 30%, more preferably 5% to 25%, and still more preferably 5% to 15% (for example, about 5% to 10%). Such a small "single partial notch" region is likely to provide improved energy density per unit volume of the secondary battery and to exhibit the stability retainability of the electrode assembly in the exterior body.

In the case of the "straight line peripheral portion", the positive electrode tab and the negative electrode tab are preferably located adjacent to each other in a plan view region between the "peripheral straight line portion of the electrode assembly" and the "circular arc portion of the exterior body". In the aspect shown in FIG. 6, the positive electrode tab 70a and the negative electrode tab 70b are located adjacent to each other in a local region 55' surrounded by a peripheral straight line portion 51 (a portion of the electrode assembly) and a circular arc portion 61 (a portion of the exterior body) in plan view. In other words, in the local region 55' surrounded by the peripheral straight line portion 51 and the circular arc portion 61 in plan view, the "integrated tab 70a' of the 'positive electrode'" and the "integrated tab 70b' of the 'negative electrode'" are preferably adjacent to each other.

In one suitable aspect, the "linear peripheral portion" is offset from the center of the substantially circular shape of the electrode assembly. That is, as shown in FIG. 2, in plan view, the peripheral straight line portion 51 is located so as not to reach the center of the "substantially circular shape of an original base shape". For example, when the "substantially circular shape of an original base shape" is a circle, the peripheral straight line portion may be located so as not to pass through the circle center and its vicinity. As can be seen from this explanation, the "center of a substantially circular shape" referred to herein indicates the center of gravity of the "substantially circular shape of an original base shape" in the plan view shape of the electrode assembly. For example, when the "substantially circular shape of an original base shape" is a circle, the "center of a substantially circular shape" indicates the center of the circle. The aspect of the "peripheral straight line portion" is likely to provide improved energy density per unit volume of the secondary battery and to exhibit the stability retainability of the electrode assembly in the exterior body. Such an aspect corresponds to an aspect in which the "partial notch" is formed by cutting away so as to include the substantially circular periphery of the base shape. Therefore, it can be said that this aspect is different from an aspect in which "only the inside of the substantially circular shape is locally cut away while the substantially circular periphery of the base shape is wholly maintained".

In the aspect shown in FIG. 6, the positive electrode tab and the negative electrode are located adjacent to each other in the region 55' between the "inner side of the circular arc portion 61 of the exterior body" and the "outer side of the linear peripheral portion 51 of the body portion of the electrode assembly" in plan view. In the present invention, it is preferable that the integrated tab 70a' of the "positive electrode" and the integrated tab 70b' of the "negative electrode" are arranged side by side so as to form a pair in such a straight line-circular arc surrounding region. The "linear peripheral portion" has a plan view shape which can be referred to as an "arcuate shape" when it deviates from the center of the substantially circular shape.

The secondary battery of the present invention can suitably utilize a "positive electrode and/or a negative electrode including an electrode material layer provided only on one surface of a current collector". Specifically, on the outermost portion (uppermost portion/lowermost portion) of the electrode assembly, the positive electrode and/or the negative electrode including the electrode material layer provided only on one surface of the current collector may be located.

As shown in FIG. 5, a "positive electrode 1' including a positive electrode material layer provided only on one surface of a current collector" may be located on the outermost portion of the electrode assembly located on the positive electrode terminal side. As can be seen from the illustrated aspect, it is preferable that the entire main surface of the current collector (particularly, the positive electrode current collector) in the electrode assembly 100' is in direct contact with the inner surface of the exterior body 60 (60A). This can more effectively reduce the resistance, and provide electrical connection between the positive electrode of the electrode assembly and the external terminal. When the "positive electrode 1' including the positive electrode material layer provided only on one surface of the current collector" is provided as described above, the dead space in the exterior body (the "dead dimension in the thickness direction") can be reduced without the battery capacitance being substantially impaired, and the energy density per unit volume can be further improved.

Similarly, a "negative electrode 2' including a negative electrode layer provided only on one surface of a current collector" may be located on the outermost portion of the electrode assembly located on the negative electrode terminal side. In such a case, as can be seen from the illustrated aspect, it is preferable that the entire main surface of the current collector (in particular, the negative electrode current collector) in the electrode assembly be in direct contact with the inner surface of the exterior body 60 (60B). This can more effectively reduce the resistance, and provide electrical connection between the negative electrode of the electrode assembly and the external terminal. When the "negative electrode 2' including the negative electrode material layer provided only on one surface of the current collector" is provided as described above, the dead space in the exterior body (the "dead dimension in the thickness direction") can be reduced without the battery capacitance being substantially impaired, and the energy density per unit volume can be further improved.

A secondary battery of a more preferable aspect is a battery using both the above two types of "one-sided material electrodes". That is, as in the secondary battery 100 of FIG. 5, it is preferable that a "positive electrode 1' including a positive electrode material layer provided only on one surface of the current collector" be located on the outermost portion (topmost portion) of the electrode assembly located on the positive electrode terminal side, and a "negative electrode 2' including a negative electrode material layer provided only on one surface of the current collector" be located on the outermost portion (bottommost portion) of the electrode assembly located on the negative electrode terminal side. This can more effectively reduce the resistance on both the positive and negative electrode sides, provide electrical connection with the electrode assembly, and further improve the energy density per unit volume without substantially impairing the battery capacitance.

In the present invention, the "single partial notch" can be embodied in various aspects. The "single partial notch" will be described in detail below.

(Aspect of Triangular Single Notch)

Figure 7:
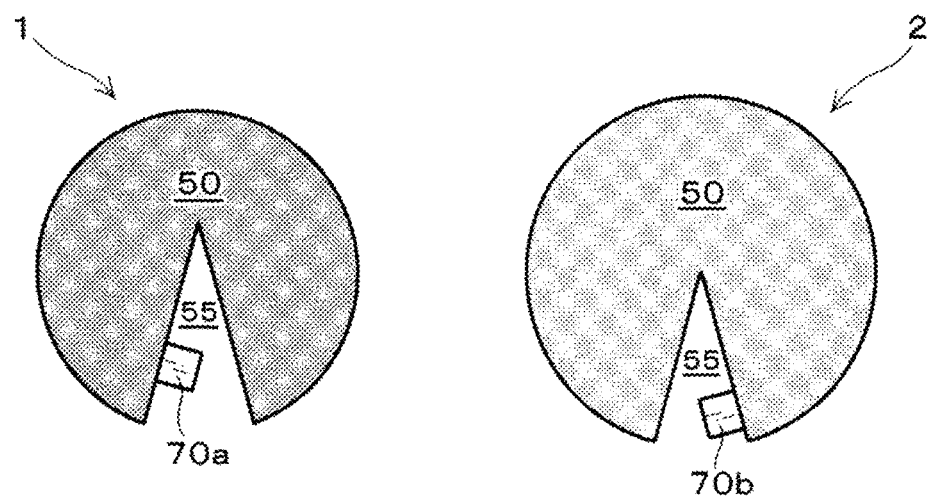
FIG. 7 is a schematic plan view showing a representative example of a "triangular single notch aspect".

A representative example of an "aspect of a triangular single notch" is shown in FIG. 7. In such an aspect, a "single partial notch" in a plan view shape 50 having circular notch is triangular. That is, for a positive electrode 1 and a negative electrode 2 configuring an electrode assembly, a single shape 55 removed from a substantially circular plan view shape corresponds to a triangular shape.

Even in such an aspect, a positive electrode tab and a negative electrode tab are preferably located adjacent to each other in a gap provided between a body portion of the electrode assembly and a side wall of an exterior body due to the "triangular single notch". That is, in plan view, it is preferable that the positive electrode tab and the negative electrode tab be arranged side by side in a region of an imaginary "triangular single notch" between the electrode assembly and the exterior body.

As can be understood from the embodiment shown in FIG. 7, the "aspect of the triangular single notch" corresponds to an aspect in which two peripheral straight line portions of the electrode assembly are present in plan view. In particular, a vertex of one of the two straight line portions is shared with a vertex of the other.

Figure 4:
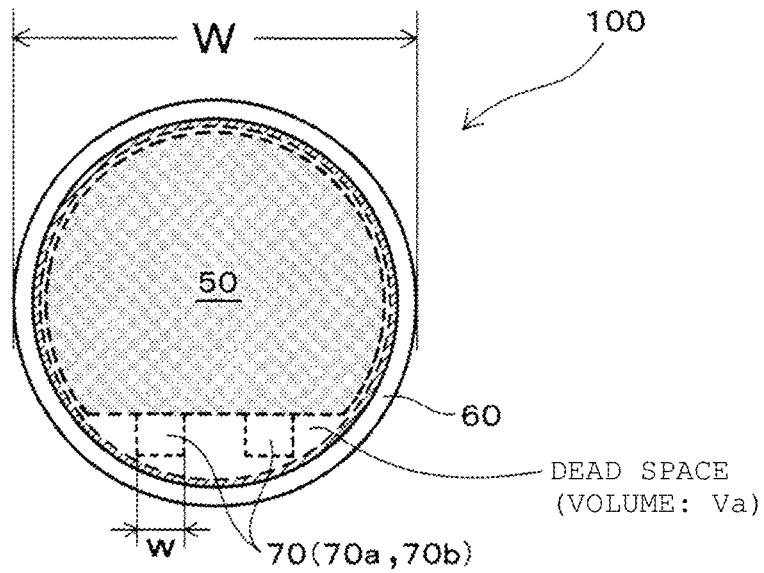
FIG. 4 is a schematic transparent plan view for illustrating the features of one embodiment of the present invention related to a "single partial notch".
Figure 4:
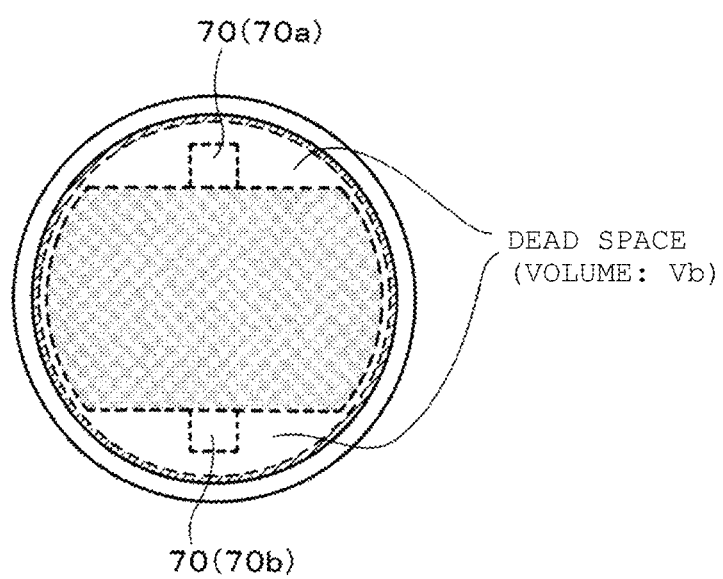

Even in the "aspect of the triangular single notch", as in the aspect described with reference to FIG. 4, the "single partial notch" can wholly reduce a dead space in the exterior body as compared with "two or more partial notches", which can provide improved energy density per unit volume.

(First Aspect of Rectangular Single Notch)

Figure 8:
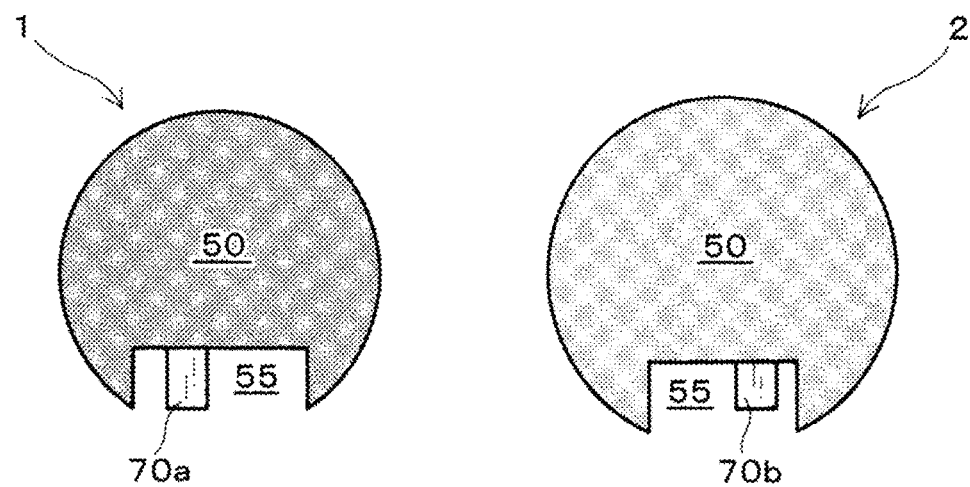
FIG. 8 is a schematic plan view showing a representative example of a "first aspect of a rectangular single notch".

A representative example of a "first aspect of a rectangular single notch" is shown in FIG. 8. In the first aspect, a "single partial notch" in a plan view shape 50 having circular notch is rectangular. That is, for a positive electrode 1 and a negative electrode 2 configuring an electrode assembly, a single shape 55 removed from a substantially circular plan view shape corresponds to a rectangular shape. In particular, a rectangular short side is directly continuous with a substantially circular arc portion in plan view.

Even in the first aspect, a positive electrode tab and a negative electrode tab are preferably located adjacent to each other in a gap provided between a body portion of an electrode assembly and a side wall of the exterior body due to the "rectangular single notch". That is, in plan view, it is preferable that the positive electrode tab and the negative electrode tab be arranged side by side in a region of an imaginary "rectangular single notch" between the electrode assembly and the exterior body.

As can be understood from the form shown in FIG. 8, the "first aspect of the rectangular single notch" corresponds to an aspect in which three peripheral straight line portions of the electrode assembly are present in plan view. In particular, one vertex of the longest straight line portion among the three straight line portions is shared with a vertex of other straight line portion, and the other vertex of the longest straight line portion is shared with a vertex of still other straight line portion.

Even in the "first aspect of the rectangular single notch", as in the aspect described with reference to FIG. 4, the "single partial notch" can wholly reduce a dead space in the exterior body as compared with "two or more partial notches", which can provide improved energy density per unit volume.

(Second Aspect of Rectangular Single Notch)

Figure 9:
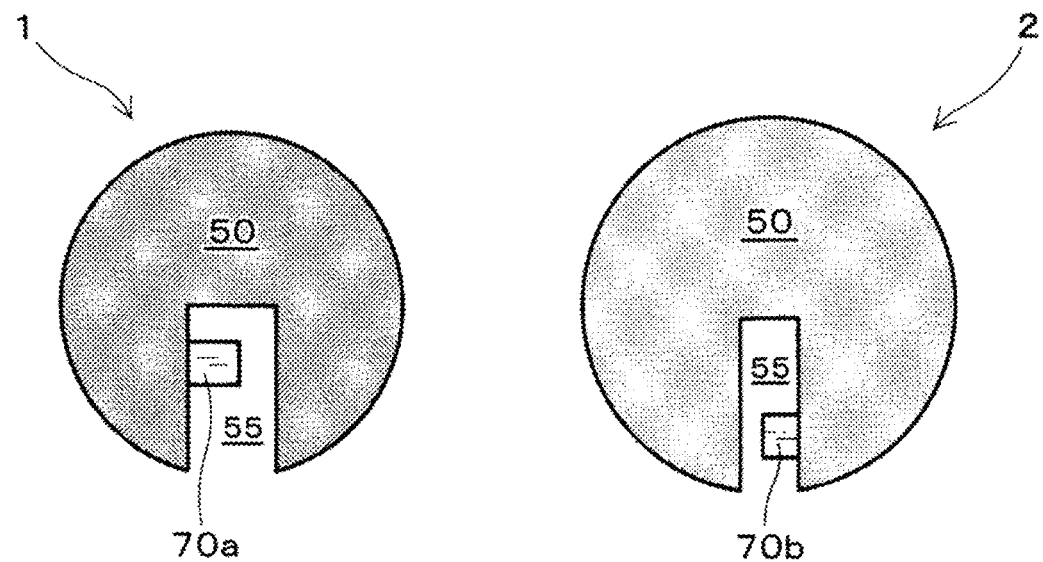
FIG. 9 is a schematic plan view showing a representative example of a "second aspect of a rectangular single notch".

A representative example of a "second aspect of a rectangular single notch" is shown in FIG. 9. Also in the second aspect, as in the first aspect, a "single partial notch" in a plan view shape having circular notch is rectangular. That is, for a positive electrode 1 and a negative electrode 2 configuring an electrode assembly, a single shape 55 removed from a substantially circular plan view shape corresponds to a rectangular shape. In particular, in the second aspect, a long side of the rectangular shape is directly continuous with a substantially circular arc portion in plan view.

Even in the second aspect, as in the first aspect, a positive electrode tab and a negative electrode tab are preferably located adjacent to each other in a gap provided between a body portion of the electrode assembly and a side wall of an exterior body due to the "rectangular single notch". That is, in plan view, it is preferable that the positive electrode tab and the negative electrode tab be arranged side by side in a region of an imaginary "rectangular single notch" between the electrode assembly and the exterior body.

As can be understood from the embodiment shown in FIG. 9, the "second aspect of the single notch having a rectangular shape" corresponds to an aspect in which three peripheral straight line portions of the electrode assembly are present in plan view. In particular, one vertex of the shortest straight line portion among the three straight line portions is shared with a vertex of other straight line portion, and the other vertex of the shortest straight line portion is shared with a vertex of still other straight line portion.

Even in the "second aspect of the rectangular single notch", as in the aspect described with reference to FIG. 4, the "single partial notch" can wholly reduce a dead space in the exterior body as compared with "two or more partial notches", which can provide improved energy density per unit volume.

Although the embodiments of the present invention have been described above, they are merely examples. Therefore, the present invention is not limited thereto, and those skilled in the art will readily understand that various aspects can be conceived.

Figure 10:
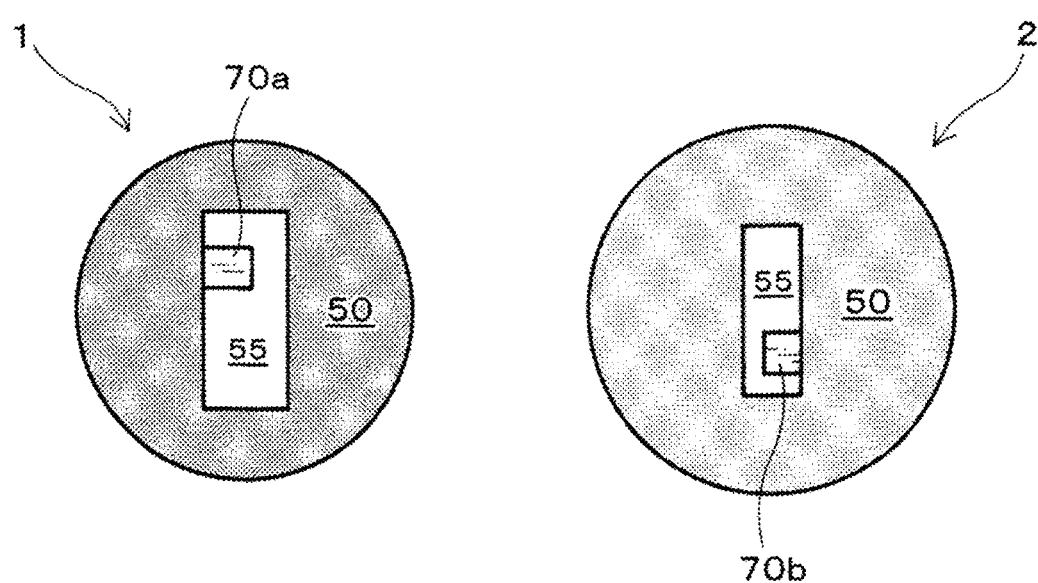
FIG. 10 is a schematic plan view showing a modification aspect of a "single partial notch".

For example, the "single partial notch" may be an aspect as shown in FIG. 10. This aspect is a rectangular single notch, but while a substantially circular periphery of a base shape is wholly maintained in a circular notch shape, only a substantially circular inner part is locally cut away. Even in such an aspect, a positive electrode tab and a negative electrode tab may be located adjacent to each other. In the illustrated aspect, the shape of the "single partial notch" is a rectangular shape, but the shape is not limited thereto, and may be a triangular shape, a square shape, and the like. Even in such a modification aspect, as in the embodiment described with reference to FIG. 4, the "single partial notch" can wholly reduce a dead space in an exterior body as compared with "two or more partial notches", which can provide improved energy density per unit volume.

The secondary battery according to the present invention can be used in various fields in which electricity storage is expected. Although the followings are merely examples, the secondary battery can be used in electricity, information and communication fields where mobile devices and the like are used (for example, mobile device fields, such as mobile phones, smart phones, smart watches, laptop computers, digital cameras, active mass meters, arm computers, and electronic paper), domestic and small industrial applications (for example, the fields such as electric tools, golf carts, domestic robots, caregiving robots, and industrial robots), large industrial applications (for example, the fields such as forklifts, elevators, and harbor cranes), transportation system fields (for example, the fields such as hybrid vehicles, electric vehicles, buses, trains, electric assisted bicycles, and two-wheeled electric vehicles), electric power system applications (for example, the fields such as various power generation systems, load conditioners, smart grids, home-installation type power storage systems), IoT applications, and space and deep sea applications (for example, the fields such as spacecraft and research submarines).

DESCRIPTION OF REFERENCE SYMBOLS

1: Positive electrode
2: Negative electrode
3: Separator
10: Electrode configuration layer
50: Plan view shape having circular notch
51: Peripheral straight line portion
55: Partial notch
55': Local area surrounded by peripheral straight line portion and circular arc portion
60: Exterior body
61: Circular arc portion
70: Tab
70a: Positive electrode tab
70b: Negative electrode tab
70a': Integrated tab (positive electrode)
70b': Integrated tab (negative electrode)
100': Electrode assembly
100: Secondary battery

The invention claimed is:

1. A secondary battery comprising:
an electrode assembly having a plurality of electrode configuration layers, each electrode configuration layer including a positive electrode having a positive electrode tab, a negative electrode having a negative electrode tab, and a separator between the positive electrode and the negative electrode, wherein the electrode assembly has a substantially circular plan view shape with a single partial notch, the positive electrode tab and the negative electrode tab are located adjacent to each other in a region defined by the single partial notch, and the region defined by the single partial notch is shaped such that the positive electrode tab is surrounded on at least two sides thereof by the positive electrode and the negative electrode tab is surrounded on at least two sides thereof by the negative electrode; and
an exterior body enclosing the electrode assembly including the single partial notch, the positive electrode tab, and the negative electrode tab.

2. The secondary battery according to claim 1, wherein the secondary battery has a substantially circular plan view shape.

3. The secondary battery according to claim 1, wherein the exterior body comprises a first part and a second part, the first part forming a positive electrode terminal, and the second part forming a negative electrode terminal.

4. The secondary battery according to claim 3, wherein the positive electrode includes a positive current collector and a positive electrode material layer only on one surface of the positive current collector, and the positive electrode is located on an outermost portion of the electrode assembly on a side of the positive electrode terminal.

5. The secondary battery according to claim 4, wherein the negative electrode includes a negative current collector and a negative electrode material layer only on one surface of the negative current collector, and the negative electrode is located on an outermost portion of the electrode assembly on a side of the negative electrode terminal.

6. The secondary battery according to claim 3, wherein the negative electrode includes a negative current collector and a negative electrode material layer only on one surface of the negative current collector, and the negative electrode is located on an outermost portion of the electrode assembly on a side of the negative electrode terminal.

7. The secondary battery according to claim 1, wherein the secondary battery has a flat three-dimensional shape.

8. The secondary battery according to claim 1, wherein the electrode assembly has a planar stacked structure in which the positive electrode, the negative electrode, and the separator are planarly stacked.

9. The secondary battery according to claim 1, wherein the positive electrode and the negative electrode each include a layer capable of occluding and releasing lithium ions.

10. The secondary battery according to claim 1, wherein the single partial notch has a triangular shape.

11. The secondary battery according to claim 1, wherein the single partial notch has a rectangular shape.

* * * * *